United States Patent [19]

Tomasevic

[11] Patent Number: 5,096,161
[45] Date of Patent: Mar. 17, 1992

[54] WHEELING MOUNTING APPARATUS

[76] Inventor: Milos Tomasevic, 16345 Redington Dr., Redington Beach, Fla. 33708

[21] Appl. No.: 630,853

[22] Filed: Dec. 20, 1990

Related U.S. Application Data

[63] Continuation-in-part of Ser. No. 590,583, Sep. 27, 1990, abandoned, which is a continuation-in-part of Ser. No. 460,985, Mar. 5, 1990, abandoned.

[51] Int. Cl.$^5$ .............................................. B66F 3/08
[52] U.S. Cl. ...................................... 254/98; 254/92; 254/7 B
[58] Field of Search ................... 254/92, 98, 100, 7 R, 254/7 B, 7 C

[56] References Cited

U.S. PATENT DOCUMENTS

| | | | |
|---|---|---|---|
| 968,315 | 8/1910 | Beckert | 254/7 B |
| 1,169,255 | 1/1916 | Graham | 254/7 B |
| 2,467,656 | 4/1949 | Schmidtke | 254/7 B |

*Primary Examiner*—J. J. Hartman
*Attorney, Agent, or Firm*—Walter J. Monacelli

[57] ABSTRACT

The apparatus described herein comprises a device for easily lifting and positioning a vehicle wheel, particularly to facilitate the lifting and positioning of a wheel for a truck or recreational vehicle onto the axle of the same and appropriately positioning the wheel for insertion of the lugs thereon. With the axle jacked to an appropriate raised position and the wheel resting on the ground next to the wheel base, two sections of the device are placed under the curvature of the wheel, a section on each side of the resting area and the sections connected to each other to prevent their separation during the lifting operation. Each section is adapted to perform an independent lifting operation on the wheel, the contact of each section with the wheel being by means of a cylindrical roller free to rotate on its axis. The joining section of the apparatus is positioned in front of the wheel and the rollers on which the wheel will rest extend under at least a substantial portion of the width of the wheel. While the opening of the wheel is being raised to the height of the raised axle, the forward or backward positioning of this opening can be adjusted to position the opening directly opposite the axle by adjusting the raising at one side or the other of the lifting sections. When the wheel opening is opposite the axle, the wheel can be rotated on the rollers to position the lug openings to place them opposite the respective lugs. Then the wheel can be pushed toward the wheel base so that the wheel is positioned on the axle and the respective lugs.

20 Claims, 4 Drawing Sheets

WHEELING MOUNTING APPARATUS

This application is a continuation-in-part of application Ser. No. 07/590,583 filed Sept. 27, 1990, which in turn is a continuation-in-part of application Ser. No. 07/460,985 filed Mar. 5, 1990, both now abandoned.

BACKGROUND OF THE INVENTION

1. Field of the Invention

This invention relates to apparatus for lifting a wheel to the raised axle of a vehicle. More specifically this invention relates to apparatus to facilitate the raising of a wheel to the axle of a vehicle, particularly a heavy wheel for a truck or recreational vehicle, and to position the openings of the wheel appropriately opposite the axle and the lugs on the wheel base. Still more specifically this invention relates to apparatus which can adjust the direction and degree of raising to properly position the wheel for movement onto the axle and lugs of the wheel base. Still more specifically this invention relates to apparatus by which the wheel can be easily transferred from the raising apparatus to the axle and lugs of the wheel base.

2. State of the Prior Art

There are a number of patents for lifting vehicles. For example, U.S. Pat. No. 968,315 shows a combination jack and truck which has four screw jacks, one at each corner of a caster supported rectangular frame. This device is used to raise vehicles having low clearance. This device is not a practical means for raising a truck wheel to the truck axle.

U.S. Pat. No. 1,169,255 describes an automobile hoist by which an automobile can be raised off the ground. This is not directed to the lifting and positioning of a wheel. Moreover this device is not capable of adjusting one part of the lifting operation from the remainder of the operation.

U.S. Pat. No. 2,467,056 shows a wagon bolster jack. Here again this is directed to a lifting device for a vehicle; it is not directed to a wheel lifting operation; and the device is not capable of adjustment of one part of the lifting operation independent of the remainder of the lifting operation.

Neither of these patents show an apparatus which will facilitate the lifting of a vehicle wheel, particularly a heavy wheel such as for trucks and recreational vehicles, and to adjust the positioning of the openings in the wheel for reception onto the axle and lugs of the wheel base.

OBJECTIVES

It is an object of this invention to provide an apparatus to facilitate the raising of a wheel to the raised axle and lugs of the wheel base of a vehicle to which the wheel is to be fastened.

It is also an object of this invention to provide an apparatus to raise and position such a wheel, particularly heavy wheels used on trucks and recreational vehicles, so that the openings of the wheel are appropriately positioned to be moved onto the axle and lugs of a wheel base of such vehicle.

It is also an object of this invention that such a raising apparatus can be easily operated by manual rotation of a screw device to raise independently one side or the other of the wheel to facilitate positioning of the appropriate openings on the wheel opposite the axle and lugs for positioning thereon.

It is also an object of this invention that such a raising apparatus should be compact and easily storable.

It is also an object of this invention that such a raising apparatus can be easily placed in position next to and under the wheel for performance of its functions.

Other objects will become obvious upon reading the detailed description of the invention as given hereinafter.

SUMMARY OF THE INVENTION

In accordance with the present invention, an easily operated raising and positioning apparatus has been conceived which meets all the above objectives. This apparatus comprises two sections which are mirror images of each other and are adjustably connected to each other at the base thereof. In principle each of these two sections comprise a triangular arrangement in which two sides of the triangular arrangement are of fixed lengths. The height or peak of each triangle is adjusted by changing the length of the bottom of the triangle. When the length of the bottom side of the triangle is at its minimum, the peak is at its highest point and when it is at its maximum length, the peak is at its lowest point. By having this bottom side of the triangle include a threaded rod rotatably attached at the bottom of the one side (as described herein), the length of the bottom side of the triangle can be adjusted in length by rotating in one direction or the other. The height desired for the purpose of this invention is increased by having one side of the triangle extended beyond the peak of the triangle.

The principle of this triangular lifting arrangement in the apparatus of this invention embodies two mirror image sections which are fixed to each other at the bases thereof by means of a connecting plate which has two spring loaded pins adapted to lock into an opening in each base. From each base there is affixed a first arm extending vertically upward at the end of the base farthest from the other mirror image section. At the end of the base closest to the other mirror image section there are two right angle irons fixed to the top of the base, each with a part of the angle iron extending vertically upward with the two upwardly extending parts spaced from each other. These two upwardly extending parts of the angle irons each have an opening into which a partially threaded rod is passed. A second arm also extending vertically upward is positioned between the two upwardly extending parts of the angle irons which second arm has a threaded opening therein into which the threaded portion of the threaded rod is received. This second arm is slidably arranged on the base but is adapted to prevent assuming a non-vertical arrangement. The threaded rod has a handwheel or disc fixed to the end thereof closest to the other mirror image section which can be rotated to effect rotation of the threaded rod. The upper section of the second upwardly extending arm is pivotally attached to a third arm. A fourth arm is pivotally attached approximately to the upper end of the upwardly extending first arm and is also pivotally attached near its opposite end to the third arm. The pivotable point of connection of the fourth and third arms is raised when the handwheel and the threaded rod are rotated in one direction and is lowered when the handwheel and threaded rod are rotated in the opposite direction. By extending the third arm beyond the point of pivotable connection to the fourth arm the degree of rising or lowering is increased with respect to the extended end of the third arm. At this extended end there is fixedly attached an axle which extends horizontally. On this axle there is positioned a cylindrical sleeve, preferably of a low friction material, such as the material marketed by the duPont Company under its TEFLON trademark, which is rotatable about the axle, and on which pressure is applied to the wheel which is to be raised.

In the operation of this apparatus for the raising of a wheel to position it on the axle and lugs of a vehicle, the wheel is arranged vertically next to the raised axle. Then the bases of the apparatus are positioned on the ground in front of the wheel with the cylindrical sleeves positioned under the wheel with one sleeve under the wheel to the left, the other sleeve arranged on the right and the handwheels in the middle, spaced from each other to leave room for maneuvering the handwheels. Then the connecting plate is fitted to the two base sections and locked into position. In this arrangement the two cylindrical sleeves may be touching the circumference of the wheel or in close proximity thereto.

By appropriately rotating the handwheels the supporting cylindrical sleeves will be raised until the opening for the axle is at the same height as the axle. If the opening is positioned horizontally to the right or left of the axle, the appropriate handwheel maneuver can be effected to move the opening horizontally to the appropriate position. When the axle opening is opposite the axle, the wheel can be rotated on the rotatable cylindrical sleeves until the lug openings are opposite the lugs on the wheel. Then the wheel is pushed toward the wheel base to position the axle and the lugs in the appropriate opening and the fastening operation completed.

The description of the apparatus of this invention is facilitated by reference to the accompanying drawings in which.

PREFERRED SPECIFIC EMBODIMENT

Figure 1:
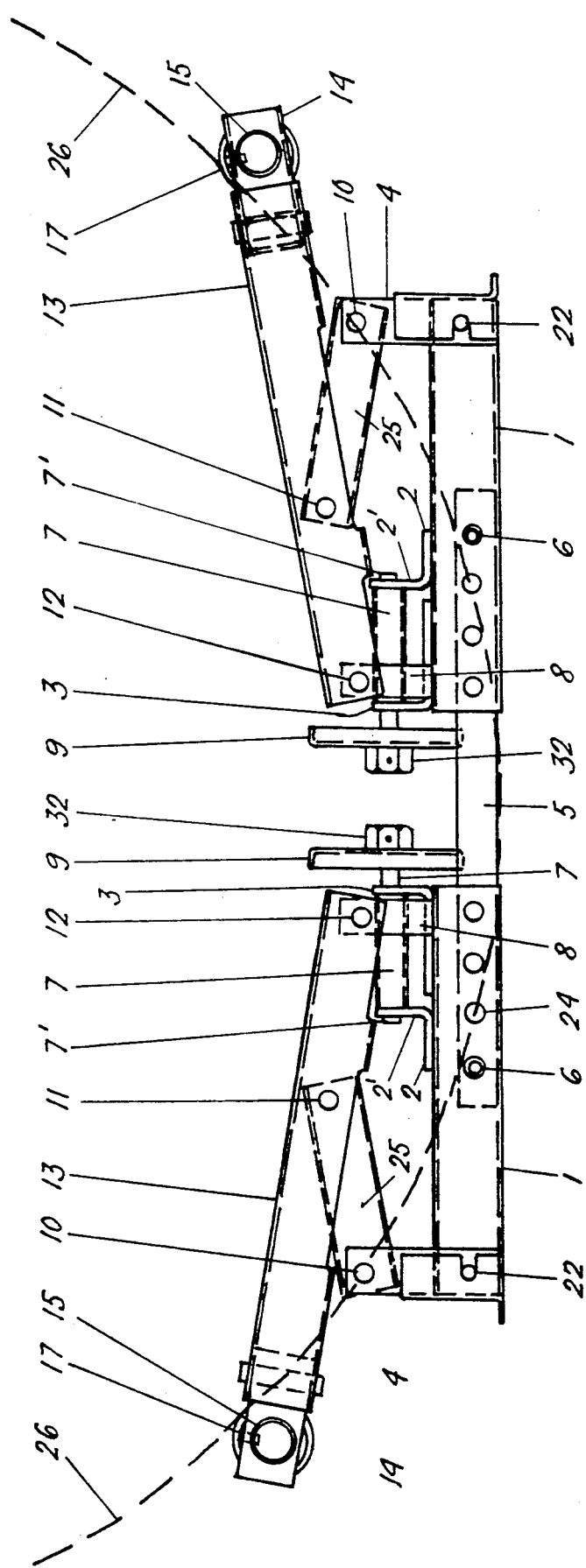
FIG. 1 is a front elevational view a preferred modification of the apparatus of this invention in its lowered position.
Figure 2:
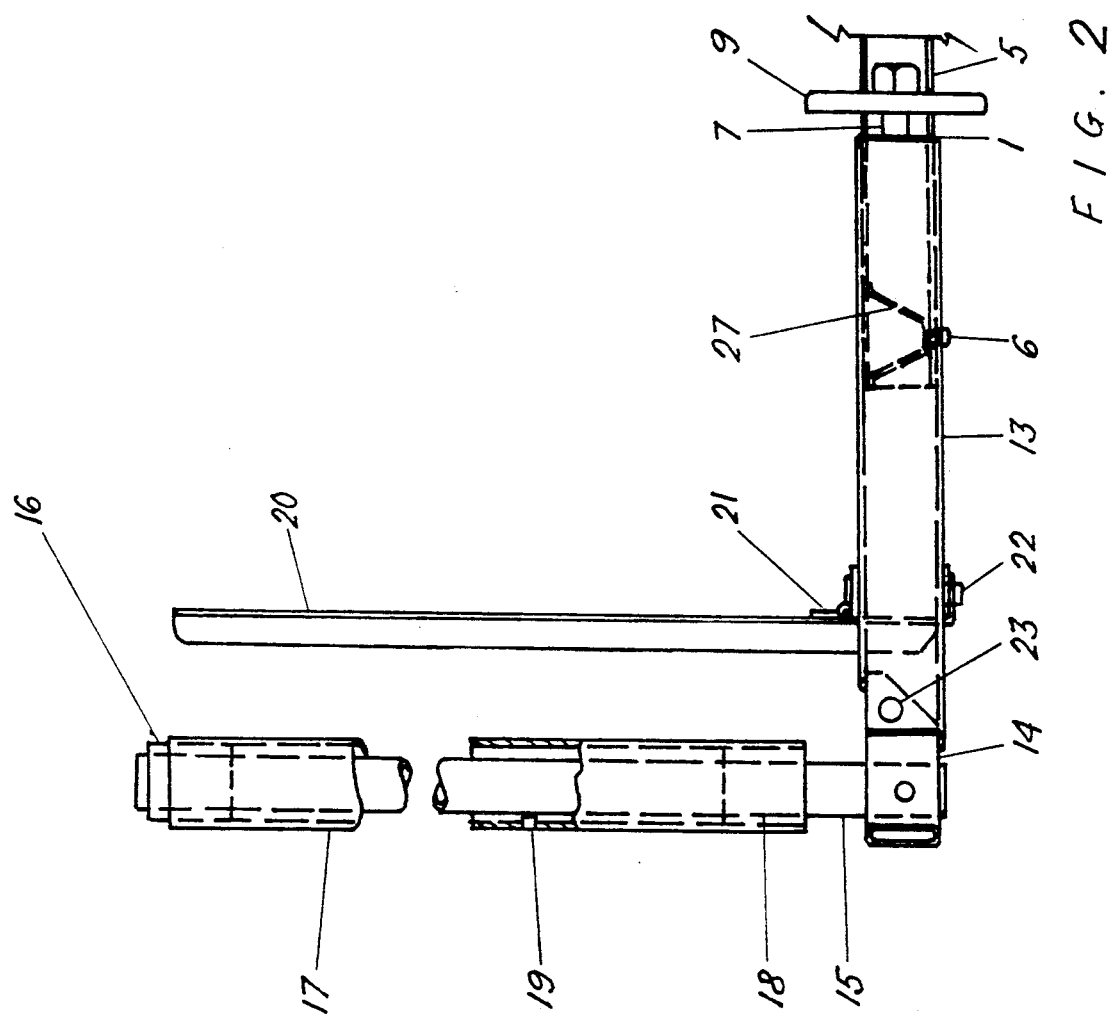
FIG. 2 is a top plan view of the apparatus of FIG. 1.

As shown in FIG. 1 the apparatus of this invention comprises two sections which are mirror images of each other and each of which has a base 1 joined by bar 5. Base 1 advantageously has a hollow interior and advantageously a rectangular cross-section, and has a number of openings 24 in the front side thereof. Bar 5 preferably has a U-shaped cross-section of appropriate dimensions so that it may be adjustably slid into the interior of base 1. Bar 5 has two openings appropriately positioned to be moved opposite the openings of base 1 and a pin 6 is pressed by spring 27 into each of the two openings (not shown) of bar 5 so that once the apparatus is placed in position next to the wheel base to be lifted, the bases can be locked together by pins 6 which extend into the adjacent opening in base 1. This also locks the two bases 1 in appropriate position for lifting the wheel.

Base 1 has right angle irons 2 and 3 fastened to its upper section with portion 2' and portion 3' extending respectively upward therefrom. Angle irons 2 and 3 are spaced from each other and positioned adjacent to that end of base 1 which is nearest the other base 1. At the opposite end of base 1 or that end which is farthest removed from the other base 1 there is a first arm 4 fastened to and extending vertically upward from base 1.

Threaded rod 7 has end 7' pivotally affixed to angle iron 2 through an opening in vertical section 2' and is slidably supported by an opening in vertical section 3'. Second arm 8 extends vertically upward and has a threaded opening (not shown) into which is fitted the threaded portion of rod 7, whereby rotation of rod 7 will move second arm 8 either to the left or to the right. The vertically extending second arm 8 has an opening in the upper region thereof and is pivotally attached by pin 12 to third arm 13. Handwheel 9 is rigidly fastened to rod 7 so that rotation of the handwheel 9 will rotate rod 7 and thereby advance or retract the lateral position of second arm 8.

Fourth arm 25 is pivotally connected by pin 10 to the first arm 4 and also by pin 11 to third arm 13. Third arm 13 extends a considerable distance beyond its pivotal connection to fourth arm 25. Rotation of handwheel 9 in one direction advances arm 8 toward first arm 4 which results in a raising of the far end of third arm 13 and rotation of handwheel 9 in the opposite direction results in the lowering of the far end of third arm 13.

At the far end of third arm 13, bracket 14 is rigidly connected to third arm 13 and supports axle 15 on which cylindrical sleeve or roller 17 is free to rotate. Axle 15 is firmly and rigidly attached perpendicularly to third arm 13 in a manner adequate to support the vehicle wheel 26 in the raising operation. Bushing 16 is affixed to the end of axle 15 and bushing 18 is affixed to the interior of sleeve or roller 17 whereby sleeve 17 cannot move completely beyond the end of the supporting axle 15. To further restrict the movment of roller 17, button or pin 19 may be affixed to the interior of roller 17. This pin has a thickness no greater than that of bushing 18 so as not to interfere with the rotation or sliding of the roller. To support the apparatus from tipping during the lifting operation brace 20 is hingably attached by hinge 20 to base 1. Pin 22 is used to hold bracing arm 20 rigid to base 1.

Figure 3:
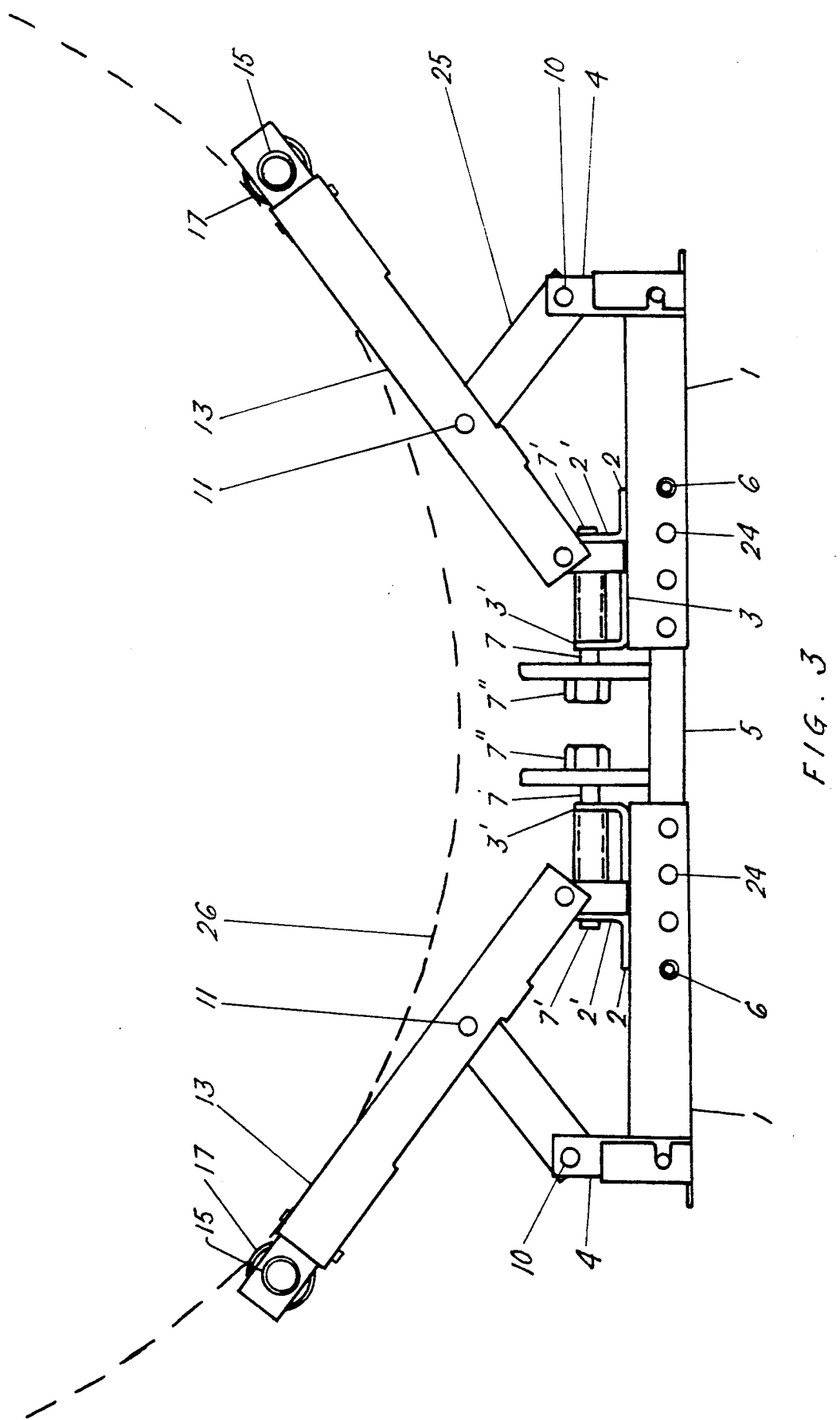
FIG. 3 is a front elevational view of the apparatus of FIG. 1 but in a raised position.

FIGS. 1 and 3 show in phantom the outline of wheel 26 as it is positioned near the apparatus in FIG. 1 and in a raised position in FIG. 3.

Figure 4:
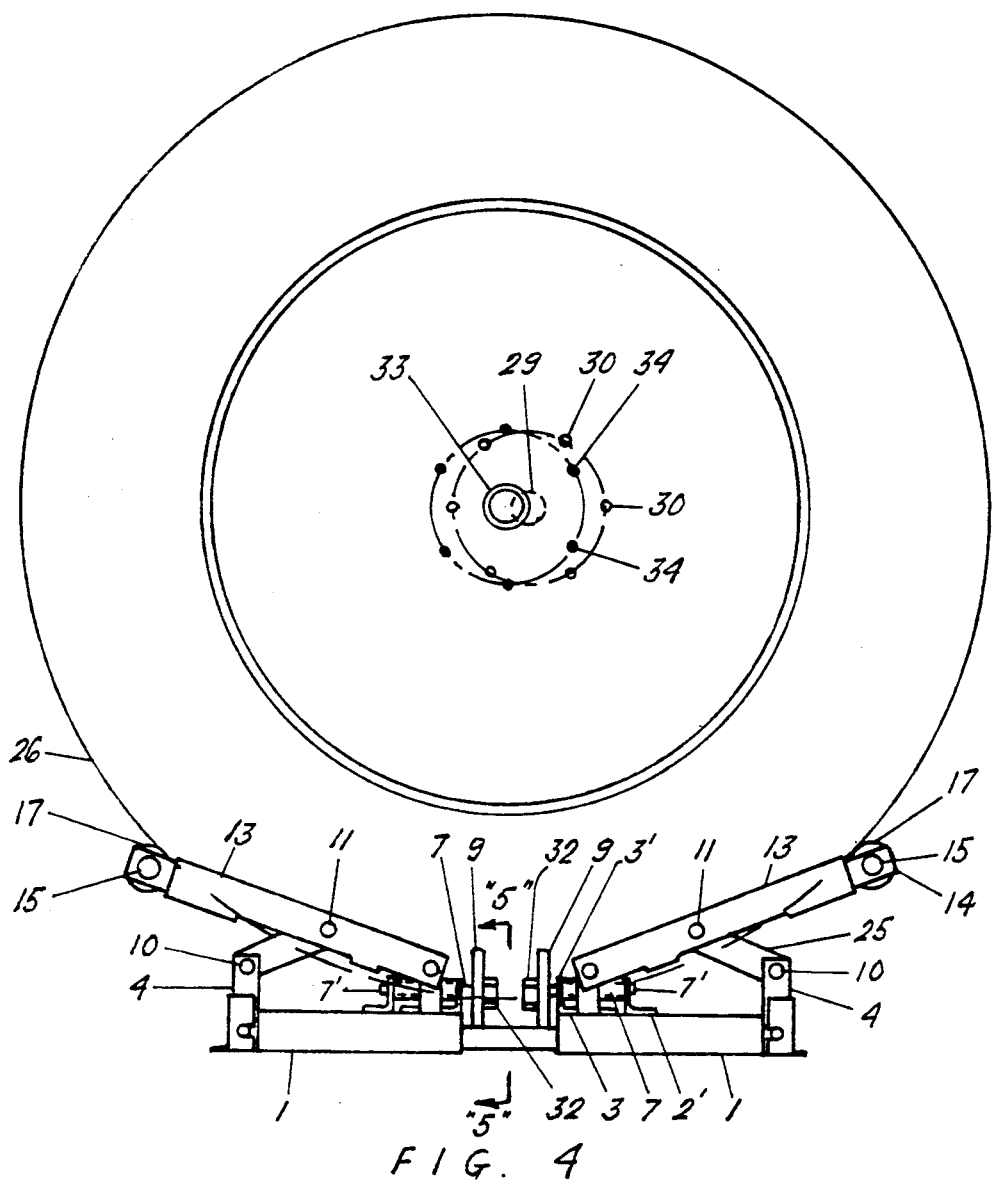
FIG. 4 is a side elevational view of the apparatus of FIG. 1 with a wheel and a wheel base shown in phantom.

FIG. 4 shows a side view of the apparatus of this invention positioned next to the vehicle wheel 26 with axle opening 33 and lug openings 34 and the wheelbase 28 having vehicle axle 29 and the end of lugs 30. The upper part of FIG. 4 in a perspective view shows wheel opening 33, axle end 29, lug openings.

Figure 5:
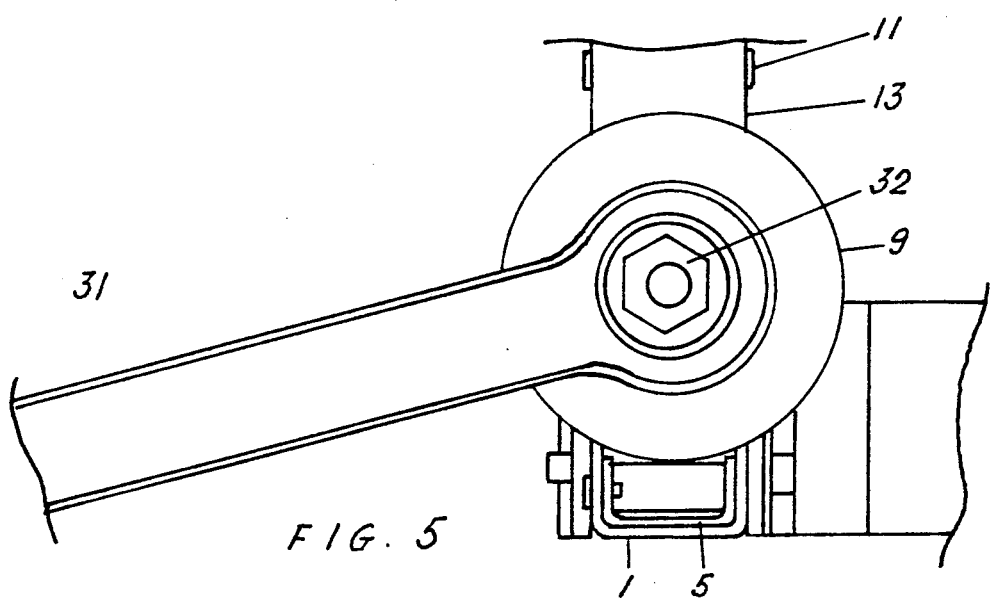
FIG. 5 is a partial side elevational view showing a rachet wrench used as the rotating means.

FIG. 5 is a cross-sectional view taken at line 5—5 of FIG. 4 but also shows a rachet wrench 31 fitted onto the end of rod 7 which has attached to it, or to the unattached side of handwheel 9, a hexagonal or other appropriate cross-section 32 to accommodate the racket wrench for rotating the rod.

With regard to the expression "mirror image" used in the above description this is intended to mean that the handwheel or other means for rotating the threaded rod 7 which moves arm 8 left or right is the closest part of each section of the apparatus to the other section of the apparatus, and may be referred to as the "near end" of the sections of the apparatus. Moreover the end section of the apparatus which holds the roller 19 is farthest removed from the other section of the apparatus, and may be referred to as the "far end" of the sections of the apparatus.

Furthermore the various arms of the apparatus may have any type of cross-section suitable to give the strength desired. However it is generally preferred that these are hollow and have a rectangular cross-section. Likewise the base 1 may be of any type of cross-section structure that will give the strength and will function as described herein. Preferably the base is hollow and has a rectangular cross-section. Likewise the connecting, locking "plate" 5 may have any appropriate type of cross-section that will permit the performance of the functions described. Preferably the cross-section has a U structure with the specified opening in any appropriate side, preferably in one of the sidewalls so that the pin of the spring-operated pin may be positioned in the opening in the sidewall and the spring of the spring-operated pin pressed against the opposite sidewall. This pin will extend beyond the sidewall and be adapted to engage one of the openings in base 1. When it is desired to move the position of plate 5, the pin can be pushed back against the spring and out of the opening in the base.

Other means for rotating threaded rod 7 may be used in place of handwheel 9. For example, the end of rod 7 may be adapted for fitting with a racket wrench. This will provide greater leverage for rotating rod 7. The racket wrench may be provided with a means for reversing the effective rotation of the rod, or when it is desired to reverse the direction of rotation of rod 7, the rod may be provided with a square or other appropriate cross-section at the end which will receive the racket wrench. Then in order to change direction the wrench could be removed, turned over and again fitted on the square end to provide a reverse direction of rotation with the same direction of stroke. A racket wrench for each rod 7 should be provided.

It is also contemplated that the handwheel may have a rotatable handle extending from the flat exterior surface of the handwheel so the the handwheel may be used as a crank.

When this apparatus is not in use, it can easily be separated for storage by separating the two sections by removal of connecting bar 5. Brace 20 may also be folded against base 1.

While certain features of this invention have been described in detail with respect to various embodiments thereof, it will of course be apparent that other modifications can be made within the spirit and scope of this invention and it is not intended to limit the invention to the exact details shown above except insofar as they are defined in the following claims.

The invention claimed is:

1. Apparatus for lifting a wheel to the raised axle of a vehicle comprising two mirror image sections each of which sections comprises:
   a. a base of substantial length and relatively narrow width having a hollow section extending through at least a substantial portion of the length thereof, said base having a near end and a far end.
   b. a locking means for locking one end of a connecting bar into the interior of the base of both sections, wherein said connecting bar has a shape and size suitable for fitting into the hollow section of each said base from the near end of each said base.
   c. a first arm extending vertically upward from said base and rigidly affixed to said base at a point approximately at the far end of said base, said first arm having an upper region and said first arm having a horizontal opening in said upper region thereof;
   d. two right angle irons fixed at the near end of said base, said angle irons being spaced from each other, one closer to the near end of said base than the other, with one part of each angle iron lying flat on and affixed to the upper surface of said base and the other part of each angle iron extending vertically upward from said base, the vertically extending parts of said angle irons lying in spaced, parallel planes vertical to the longitudinal axis of said base, each said vertically extending part of said angle irons having an opening therethrough, said openings being aligned with each other for receiving a rod therethrough;
   e. a partially threaded rod fitting through said openings in said vertically extending parts of said angle irons, one end of said rod being rotatably fixed to the angle iron farthest removed from the near end of said base, and the other end of said rod extending beyond the opening in the angle iron closer to the near end of said base;
   f. means to rotate said partially threaded rod by acting on the part of said rod extending beyond the opening in said angle iron closer to the near end of said base;
   g. a second arm having an upper region and a lower region, said second arm extending vertically upward from said base between said two upward extending parts of said angle irons, said second arm being movable with respect to said base and having a first threaded opening therein to cooperate with the threads on said partially threaded rod and to be moved forward and backward upon rotation of said rod, said second arm having a second opening therein above the first opening, the center axis of said second opening being perpendicular to the center axis of the first opening in said second arm;
   h. a third arm having a length sufficient to reach from the vertical part of said angle iron closest to the near end of said base and extending to a point beyond said first arm, a first opening extending horizontally through said third arm positioned near the end of said third arm closest to the near end of said base and a second opening extending horizontally through said third arm at a point spaced a substantial distance from said first opening in said third arm;
   i. a first connecting means for pivotally connecting said third arm through said first opening in said third arm to said second arm through said second opening in said second arm;
   j. a fourth arm having a first horizontal opening near one end of said fourth arm and a second horizontal opening near the other end of said fourth arm, the length of said fourth arm between said openings in said fourth arm being sufficient to reach from said opening in the upper region of said first arm to said second opening in said third arm;
   k. a second connecting means for connecting said first arm through said opening in the upper region of said first arm to said fourth arm through said first horizontal opening in said fourth arm;
   l. a third connecting means for connecting said fourth arm through said second horizontal opening in said fourth arm to said third arm through said second opening in said third arm;

m. a holding means firmly attached to said third arm at the end thereof remote from the said first opening in said third arm;

n. an axle extending horizontally and perpendicularly from said holding means, said axle having a length at least sufficient to reach across the width of the wheel to be lifted;

o. a cylindrical sleeve mounted onto said axle extending from said holding means and adapted to rotate on its longitudinal axis; and p. a bracing bar attached to said base and extending horizontally and perpendicularly from said base and in a direction parallel to said axle extending from said holding means; whereby the rotation of said rotating means in one direction effects the lifting of said axle extending from said holding means together with said sleeve on said axle and rotation of said rotating means in the opposite direction effects the lowering of said axle extending from said holding means and said sleeve on said axle.

2. The apparatus of claim 1 in which said hollow base has a rectangular cross-section with a top, a bottom and two sidewalls.

3. The apparatus of claim 2 in which said base has a plurality of openings in said sidewall spaced from each other and at the same height from said bottom of said base.

4. The apparatus of claim 3 in which said bar has a ⊔-shape cross-section with two sidewalls and a bottom of which the said bottom will rest on the bottom of said hollow base, and said ⊔-shaped bar has an opening in one of said sidewalls, said bar-sidewall opening being at a height and at a position that it may be moved to be in juxtaposition to any of the said sidewall openings in said base.

5. The apparatus of claim 4 in which said locking means comprises a spring-loaded pin, which pin extends through said sidewall opening of said ⊔-shaped bar and a sufficient distance beyond said sidewall opening to enter into an adjacent opening in said base sidewall.

6. The apparatus of claim 5 in which said spring of said spring-loaded pin rests against the opposite sidewall from the sidewall of said bar in which said bar sidewall opening is positioned.

7. The apparatus of claim 6 in which each of said first, second and third connecting means is a pin which has its ends flattened to prevent the pin from escaping from the opening in which it is positioned.

8. The apparatus of claim 6 in which said sleeve has a low friction surface.

9. The apparatus of claim 8 in which said sleeve is free to move a substantial distance with respect to its longitudinal axis.

10. The apparatus of claim 9 in which said sleeve has a stopping means which prevents said sleeve from moving completely off of said axle.

11. The apparatus of claim 10 in which said axle has a bushing affixed to the cylindrical surface of said axle at a position between the midpoint of the length of said axle and the unattached end of said axle, said bushing having an exterior cylindrical surface dimension to fit inside said sleeve.

12. The apparatus of claim 11 in which said sleeve has a bushing affixed to the interior surface of said sleeve at a position between the longitudinal quarter point of said sleeve and the end of said sleeve adjacent to the attached end of said axle, the interior of said sleeve bushing is cylindrical and of a dimension to fit slidably over the exterior surface of said axle.

13. The apparatus of claim 12 in which said sleeve has a button affixed to the interior surface thereof which has a height that will not press against the exterior surface of the axle but is of sufficient height to prevent the sleeve from sliding any further on the axle when said button reaches said bushing affixed to said axle extending from said holding means.

14. The apparatus of claim 1 in which said means to rotate said partially threaded rod is a rachet wrench fitted onto the end of said rod.

15. A process for lifting and positioning a wheel to the raised axle of the vehicle on which the wheel is to be fitted comprising the steps of:

(A) resting the wheel in an upright position on the ground and in close proximity to said axle with the axle opening of the wheel substantially below and in front of the raised axle;

(B) positioning a lifting apparatus on the ground in front of said wheel, said lifting apparatus comprising two mirror image sections each of which sections comprises:

a. a base of substantial length and relatively narrow width having a hollow section extending through at least a substantial portion of the length thereof, said base having a near end and a far end;

b. a locking means for locking one end of a connecting bar into the interior of the base of both sections, wherein said connecting bar has a shape and size suitable for fitting into the hollow section of each said base from the near end of each said base;

c. a first arm extending vertically upward from said base and rigidly affixed to said base at a point approximately at the far end of said base, said first arm having an upper region and said first arm having a horizontal opening in said upper region thereof;

d. two right angle irons fixed at the near end of said base, said angle irons being spaced from each other, one closer to the near end of said base than the other, with one part of each angle iron lying flat on and affixed to the upper surface of said base and the other part of each angle iron extending vertically upward from said base, the vertically extending parts of said angle irons lying in spaced, parallel planes vertical to the longitudinal axis of said base, each said vertically extending part of said angle irons having an opening therethrough, said openings being aligned with each other for receiving a rod therethrough;

e. a partially threaded rod fitting through said openings in said vertically extending parts of said angle irons, one end of said rod being rotatably fixed to the angle iron farthest removed from the near end of said base, and the other end of said rod extending beyond the opening in the angle iron closer to the near end of said base;

f. means to rotate said partially threaded rod by acting on the part of said rod extending beyond the opening in said angle iron closer to the near end of said base;

g. a second arm having an upper region and a lower region, said second arm extending vertically upward from said base between said two upward extending parts of said angle irons, said second arm being movable with respect to said base and having a first threaded opening therein to cooperate with the threads on said partially threaded rod and to be moved forward and backward upon rotation of said rod, said second arm having a second opening therein above the first opening, the center axis of said second opening perpendicular to the center axis of the first opening in said second arm;

h. a third arm having a length sufficient to reach from the vertical part of said angle iron closest to the near end of said base and extending to a point beyond said first arm, a first opening extending horizontally through said third arm positioned near the end of said third arm closest to the near end of said base and a second opening extending horizontally through said third arm at a point spaced a substantial distance from said first opening in said third arm;

i. a first connecting means for pivotally connecting said third arm through said first opening in said third arm to said second arm through said second opening in said second arm;

j. a fourth arm having a first horizontal opening near one end of said fourth arm and a second horizontal opening near the other end of said fourth arm, the length of said fourth arm between said openings in said fourth arm being sufficient to reach from said opening in the upper region of said first arm to said second opening in said third arm;

k. a second connecting means for connecting said first arm through said opening in the upper region of said first arm to said fourth arm through said first horizontal opening in said fourth arm;

l. a third connecting means for connecting said fourth arm through said second horizontal opening in said fourth arm to said third arm through said second opening in said third arm;

m. a holding means firmly attached to said third arm at the end thereof remote from the said first opening in said third arm;

n. an axle extending horizontally and perpendicularly from said holding means, said axle having a length at least sufficient to reach across the width of the wheel to be lifted;

o. a cylindrical sleeve mounted onto said axle extending from said holding means to rotate on its longitudinal axis; and p. a bracing bar attached to said base and extending horizontally and perpendicularly from said base and in a direction parallel to said axle extending from said holding means;

(C) adjusting said connecting bar inside the hollow openings of the two bases to give the appropriate distance between said sleeve rollers of said apparatus to have them in contact with said wheel, one sleeve roller being positioned on one side of the resting place of said wheel on the ground and the other sleeve roller being positioned on the other side of said resting place, said connecting bar being locked into both bases by said spring-loaded pins fitting into the appropriate openings in said bases;

(D) rotating said rotating means whereby said sleeve rollers are raised and raise the wheel with them, the rotation of said rotating means being adjusted to direct the axle opening of said wheel to a position directly opposite the axle;

(E) when said axle opening in said wheel is directly opposite said axle, said wheel is rotated on said sleeve rollers to position the lug openings on said wheel opposite the lugs on said wheel base;

(F) pushing the wheel horizontally on said sleeve rollers toward said wheel base to position the axle opening on the axle and the lug openings of the wheel on the respective lugs on the wheel base;

(G) placing and tightening lug nuts on the respective lugs; and (H) removing said lifting apparatus.

16. The process of claim 15 in which said means for rotating said partially threaded rod is a handwheel affixed to the end of said rod.

17. The process of claim 15 in which said means for rotating said partially threaded rod is a ratchet wrench fitted onto the end of said rod.

18. The process of claim 15 in which said hollow base has a rectangular cross-section with a top, a bottom and two sidewalls.

19. The process of claim 15 in which said base has a plurality of openings in said sidewall spaced from each other and at the same height from said bottom of said base.

20. The process of claim 19 in which said bar has a ⊔-shape cross-section with two sidewalls and a bottom of which the said bottom will rest on the bottom of said hollow base, and said ⊔-shaped bar has an opening in one of said sidewalls, said bar-sidewall opening being at a height and at a position that it may be moved to be in juxtaposition to any of the said sidewall openings in said base.

* * * * *